(12) United States Patent
Lee et al.

(10) Patent No.: US 11,405,919 B2
(45) Date of Patent: Aug. 2, 2022

(54) METHODS AND APPARATUSES FOR WIRELESS COMMUNICATION USING ANTENNA ARRAY

(71) Applicant: Samsung Electronics Co., Ltd., Suwon-si (KR)

(72) Inventors: Jun-ho Lee, Hwaseong-si (KR); Sang Won Son, Palo Alto, CA (US); Hyun-seok Yu, Seoul (KR); Young-seok Jung, Suwon-si (KR); Hui-won Je, Gwacheon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 456 days.

(21) Appl. No.: 16/035,811

(22) Filed: Jul. 16, 2018

(65) Prior Publication Data
US 2019/0037574 A1 Jan. 31, 2019

(30) Foreign Application Priority Data

Jul. 26, 2017 (KR) .................. 10-2017-0094964
Feb. 12, 2018 (KR) .................. 10-2018-0017061

(51) Int. Cl.
*H04B 7/06* (2006.01)
*H04B 17/12* (2015.01)
(Continued)

(52) U.S. Cl.
CPC ...... *H04W 72/0473* (2013.01); *H04B 7/0608* (2013.01); *H04B 7/0691* (2013.01);
(Continued)

(58) Field of Classification Search
CPC ...... H04B 7/02–0697; H04B 17/10–14; H04L 5/0091–0098; H04W 16/28; H04W 52/02–60; H04W 72/0473; H04W 92/10
See application file for complete search history.

(56) References Cited

U.S. PATENT DOCUMENTS 6,922,445 B1 * 7/2005 Sampath ............. H04B 7/0669
                                                        375/267
8,462,741 B2   6/2013 Zhang et al.
(Continued)

FOREIGN PATENT DOCUMENTS

KR    10-2008-0011823 A    2/2008
KR       10-1077775 B1    10/2011

OTHER PUBLICATIONS

Taiwanese Office Action dated Aug. 20, 2021, for corresponding Taiwanese Patent Application No. 107125790.
(Continued)

*Primary Examiner* — Timothy J Weidner
(74) *Attorney, Agent, or Firm* — Harness, Dickey & Pierce, P.L.C.

(57) ABSTRACT

A wireless communication method using a plurality of antennas performed by a controller, the wireless communication method including obtaining a target transmission power level and beam forming information, determining at least one inactive antenna from among the plurality of antennas, based on the target transmission power level and the beam forming information, and controlling transmission signals provided to the plurality of antennas such that transmission via the at least one inactive antenna does not occur.

20 Claims, 10 Drawing Sheets

(51) Int. Cl.
*H04B 17/13* (2015.01)
*H04W 16/28* (2009.01)
*H04W 52/34* (2009.01)
*H04W 52/42* (2009.01)
*H04W 72/04* (2009.01)
*H04W 92/10* (2009.01)

(52) U.S. Cl.
CPC ............ *H04B 17/12* (2015.01); *H04B 17/13* (2015.01); *H04W 16/28* (2013.01); *H04W 52/346* (2013.01); *H04W 52/42* (2013.01); *H04W 92/10* (2013.01)

(56) References Cited

U.S. PATENT DOCUMENTS

| | | | |
|---|---|---|---|
| 8,838,161 B2 | 9/2014 | Lee et al. | |
| 8,843,171 B2 | 9/2014 | Nishikawa et al. | |
| 8,977,312 B2 | 3/2015 | Lee et al. | |
| 9,031,600 B2 | 5/2015 | Pelletier et al. | |
| 9,167,535 B2 | 10/2015 | Christoffersson et al. | |
| 2009/0046802 A1 | 2/2009 | Subramaniam et al. | |
| 2013/0223554 A1* | 8/2013 | Hong | H04B 7/0413 375/267 |
| 2016/0087339 A1* | 3/2016 | Bull | H04B 7/0617 342/367 |
| 2016/0233580 A1* | 8/2016 | Aparin | H04W 52/52 342/372 |
| 2017/0244455 A1* | 8/2017 | Urzhumov | H04B 7/0413 375/267 |
| 2018/0198204 A1* | 7/2018 | Kovacic | H04W 52/367 342/372 |

OTHER PUBLICATIONS

Korean Office Action dated Mar. 25, 2022 for corresponding KR Patent Application No. 10-2018-0017061.

Document 5D "Modelling and simulation of IMT networks for use in sharing and compatibility studies" R1-1608573, (Sep. 30, 2016) pp. 1-33.

\* cited by examiner

FIG. 7A

| Number of Inactive Antennas | Inactive Antenna Index | Antenna Array |
|---|---|---|
| 1 | (1) | |
|   | (8) | |
| 2 | (1, 2) | |
|   | (1, 8) | |
|   | (7, 8) | |
| 3 | (1, 2, 3) | |
|   | (1, 2, 8) | |
|   | (1, 7, 8) | |
|   | (6, 7, 8) | |
| 4 | (1, 2, 3, 4) | |
|   | (1, 2, 3, 8) | |
|   | (1, 2, 7, 8) | |
|   | (1, 6, 7, 8) | |
|   | (5, 6, 7, 8) | |

▽ : Inactive Antenna  Y : Active Antenna

METHODS AND APPARATUSES FOR WIRELESS COMMUNICATION USING ANTENNA ARRAY

CROSS-REFERENCE TO RELATED APPLICATIONS

This application claims the benefits of Korean Patent Application No. 10-2017-0094964, filed on Jul. 26, 2017, and Korean Patent Application No. 10-2018-0017061, filed on Feb. 12, 2018, in the Korean Intellectual Property Office, the disclosures of which are incorporated herein in their entirety by reference.

BACKGROUND

Some example embodiments relate to wireless communication, and more particularly, to methods and apparatuses for wireless communication using an antenna array.

Beam forming may refer to a method of transmitting signals having directivity by using an antenna array including a plurality of antennas. Like millimeter wave communication, this beam forming may be used to overcome high path loss. Wireless communication equipment, for example, a base station or terminal (or user equipment), may transmit a signal with transmission power having a magnitude sufficient for the opposite party, namely, a reception side, to obtain information from a received signal. However, an increase in the transmission power may cause interference with transmissions between pieces of other wireless communication equipment, and may increase power consumption of a wireless communication device, for example, the wireless communication equipment. The wireless communication equipment may have a target transmission power sufficient to transmit a signal to the reception side, and accordingly it may be desirable to maintain a direction of a beam due to beam forming while satisfying the target transmission power.

SUMMARY

Some example embodiments provide methods and apparatuses for efficiently satisfying a target transmission power in wireless communication that employs beam forming.

According to some example embodiments, there is provided a wireless communication method using a plurality of antennas performed by a controller. The wireless communication method includes obtaining a target transmission power level and beam forming information. The wireless communication method further includes determining at least one inactive antenna from among the plurality of antennas, based on the target transmission power level and the beam forming information. The wireless communication method further includes controlling transmission signals provided to the plurality of antennas such that transmission via the at least one inactive antenna does not occur.

According to some example embodiments, there is provided an apparatus for controlling a plurality of antennas. The apparatus including a phase controller configured to generate a phase control signal for controlling respective phases of a plurality of transmission signals output via the plurality of antennas to transmit a beam in a first direction. The apparatus further including a power controller configured to generate a power control signal for controlling respective transmission powers of the plurality of transmission signals, and selectively inactivate one or more antennas of the plurality of antennas based on a target transmission power level and the respective phases.

According to some example embodiments, there is provided wireless communication equipment. The wireless communication equipment including an antenna array including a plurality of antennas. The wireless communication equipment further including a plurality of phase shifters configured to adjust respective phases of a plurality of transmission signals output via the plurality of antennas; a plurality of power amplifiers configured to adjust respective transmission powers of the plurality of transmission signals. The wireless communication equipment further including a controller configured to control the plurality of phase shifters, and control the plurality of power amplifiers such that one or more antennas among the plurality of antennas is selectively inactivated based on a target transmission power level and beam forming information.

BRIEF DESCRIPTION OF THE DRAWINGS

Some example embodiments will be more clearly understood from the following detailed description taken in conjunction with the accompanying drawings in which:

FIGS. 7A and 7B illustrate patterns of inactive antennas and beams based on the patterns according to some example embodiments;

DETAILED DESCRIPTION

Figure 1:
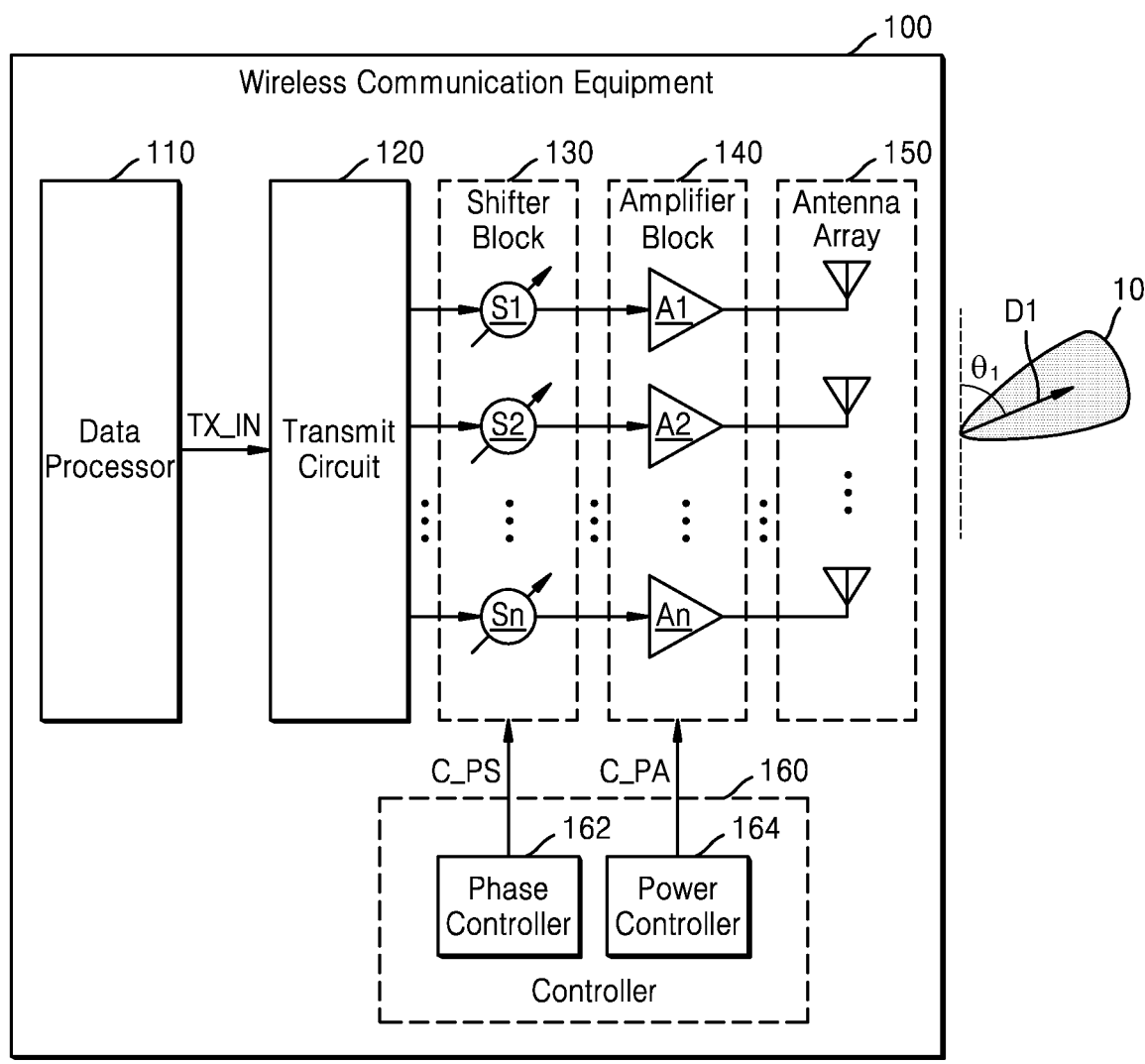
FIG. 1 is a block diagram of wireless communication equipment according to some example embodiments.

FIG. 1 is a block diagram of wireless communication equipment 100 according to some example embodiments. The wireless communication equipment 100 may communicate with other wireless communication equipment in a wireless communication system by using an antenna array 150 including a plurality of antennas.

As a non-limiting example, a wireless communication system in which the wireless communication equipment 100 communicates with other wireless communication equipment may be a 5th generation wireless (5G) system, a Long Term Evolution (LTE) system, an LTE-Advanced system, a Code Division Multiple Access (CDMA) system, a Global System for Mobile Communications (GSM) system, a Wireless Local Area Network (WLAN) system, or another arbitrary wireless communication system. Hereinafter, the wireless communication system will be described as a 5G system and/or an LTE system, but one or more example embodiments are not limited thereto.

A wireless communication network of the wireless communication system may support communication between users by allowing available network resources to be shared. For example, via a wireless communication network, information may be transmitted in various multiple access manners such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), Orthogonal Frequency Division Multiplex (OFDM) FDMA (OFDM-FDMA), OFDM-TDMA, or OFDM-CDMA.

According to some example embodiments, the wireless communication equipment 100 may be a base station (BS) or user equipment (UE) in the wireless communication system. In general, the BS may refer to a fixed station communicating with a UE and/or other BSs, and may exchange data and control information with the UE and/or the other BSs by communicating with the UE and/or the other BSs. For example, the BS may be referred to as a Node B, an evolved-Node B (eNB), a sector, a site, a Base Transceiver System (BTS), an Access Point (AP), a relay node, a Remote Radio Head (RRH), a Radio Unit (RU), or a small cell. In this disclosure, the BS or cell may refer to a function or an area covered by a base station controller (BSC) in CDMA, a Node-B in Wide Band CDMA (WCDMA), an eNB or a sector (site) in LTE, and may include a mega cell, a macro cell, a micro cell, a picocell, a femtocell, and/or various coverage areas, e.g., coverage ranges of a relay node, an RRH, an RU, or a small cell.

The UE may be at a fixed location or may be portable and may denote various devices capable of receiving and transmitting data and/or control information from and to the BS by communicating with the BS. For example, the UE may refer to terminal equipment, a Mobile Station (MS), a Mobile Terminal (MT), a User Terminal (UT), a Subscriber Station (SS), a wireless device, or a handheld device. Hereinafter, some example embodiments will be described by mainly referring to UE, but one or more example embodiments are not limited thereto.

Referring to FIG. 1, the wireless communication equipment 100 may include a data processor 110, a transmit circuit 120, a shifter block 130, an amplifier block 140, an antenna array 150, and a controller 160. The transmit circuit 120, the shifter block 130, and the amplifier block 140, which process a transmission input signal TX_IN output by the data processor 110 and provide the processed signal to the antenna array 150, may be referred to as a transmitter. According to some example embodiments, the controller 160 may be included in the data processor 110, and the data processor 110 may be referred to as a modem. Although not shown in FIG. 1, the wireless communication equipment 100 may include components for processing a signal received via the antenna array 150, for example, a low noise amplifier (LNA) and a reception circuit, and a signal output by the reception circuit may be provided to the data processor 110. Components that process a signal received via the antenna array 150 and provide the processed signal to the data processor 110 may be referred to as a receiver. According to some example embodiments, the wireless communication equipment 100 may include a transceiver including a transmitter and a receiver, and may include a plurality of transceivers. According to some example embodiments, described herein as being performed by any or all of the transmit circuit 120, the shifter block 130, the amplifier block 140, the LNA and the reception circuit may be performed by circuitry. For example, the circuitry may include an application-specific integrated circuit (ASIC) or a field programmable gate array (FPGA).

The data processor 110 may generate a transmission input signal TX_IN including information that is to be transmitted to the other wireless communication equipment. For example, the data processor 110 may perform encoding, modulation, or the like on data including information that is to be transmitted according to what the wireless communication system prescribes. According to some example embodiments, the wireless communication equipment 100 may include a plurality of antenna arrays, and the data processor 110 may provide a plurality of transmission input signals to a plurality of transmit circuits by performing data (or digital) precoding for Multi-Input-Multi-Output (MIMO). According to some example embodiments, the data processor 110 may include at least one core and a memory storing instructions performed by the core. According to some example embodiments, the data processor 110 may include a logic circuit designed by logic synthesis.

The transmit circuit 120 may provide a plurality of signals to the shifter block 130 by processing the transmission input signal TX_IN received from the data processor 110. For example, the transmit circuit 120 may include not only a mixer that moves a baseband signal to a radio frequency (RF) band, but also a filter, a switch, and the like.

The shifter block 130 may include a plurality of phase shifters S1, S2, . . . , and Sn. Each of the plurality of phase shifters S1, S2, . . . , and Sn may shift the phase of a signal received from the transmit circuit 120 according to a phase control signal C_PS provided by the controller 160. The plurality of phase shifters S1, S2, . . . , and Sn included in the shifter block 130 may be controlled by the phase control signal C_PS such that a beam 10 (e.g., an antenna beam or a transmission beam) is formed in a direction toward the opposite wireless communication equipment, namely, in a first direction D1. For example, the beam 10 may be formed by increasing an entire antenna gain directed in the first direction D1 or suppressing specific major interferences, and this formation of the beam 10, which is directional, in the wireless communication equipment 100 may be referred to as beam forming.

The amplifier block 140 may include a plurality of power amplifiers A1, A2, . . . , and An. The power amplifiers A1, A2, . . . , and An may respectively amplify signals provided by the shifter block 130 according to a power control signal C_PA provided by the controller 160. Transmission power of a signal (e.g., the beam 10) output via the antenna array 150 may be determined by the plurality of power amplifiers A1, A2, . . . , and An of the amplifier block 140.

Referring to FIG. 1, the amplifier block 140 may include the plurality of power amplifiers A1, A2, . . . , and An respectively corresponding to a plurality of antennas of the antenna array 150. The plurality of power amplifiers A1, A2, . . . , and An may be designed in consideration of manufacturing costs, an area, power consumption, and the like, and accordingly may have relatively a narrow dynamic range, namely, a linear range. It would be desirable for the wireless communication equipment 100 to transmit a signal with transmission power having a magnitude sufficient for the opposite wireless communication equipment to obtain information from a received signal, whereas the transmission power may be limited according to interference with transmissions between the other wireless communication equipment and power consumption of the wireless communication equipment 100. Accordingly, the wireless communication equipment 100 may have a target transmission power level (also referred to herein as a "target transmission power"). As will be described later with reference to FIG. 3, the wireless communication equipment 100 may obtain the target transmission power according to various methods. As the plurality of power amplifiers A1, A2, . . . , and An are controlled by the controller 160 (or a power controller 164), the target transmission power may be attained.

The antenna array 150 may include a plurality of antennas, which may respectively receive signals from the plurality of power amplifiers A1, A2, . . . , and An of the amplifier block 140. Referring to FIG. 1, the beam 10 output by the antenna array 150 may be output in the first direction D1, and the first direction D1 have a first angle $\theta_1$ with respect to the antenna array 150. The plurality of antennas included in the antenna array 150 may be arranged in a row as will be described later with reference to FIG. 7A, or may be arranged in a matrix form on a two-dimensional (2D) plane as will be described later with reference to FIG. 10. In this disclosure, a space in which the beam 10 is output by the antenna array 150 may be referred to as a beam space of which a starting point is a point where the antenna array 150 and the beam 10 form an angle (for example, $\theta_1$). The beam space may correspond to a 2D plane when the plurality of antennas are arranged in a row, whereas the beam space may correspond to a three-dimensional (3D) space when the plurality of antennas are arranged on a 2D plane. According to some example embodiments, as will be described later with reference to FIG. 4, the beam space may be used to calculate a beam error that is used to determine an inactive antenna.

The controller 160 may include a phase controller 162 and the power controller 164. The phase controller 162 may obtain information about a direction toward the opposite wireless communication equipment, namely, the first direction D1, and may determine, based on the first direction D1, phases of signals output via the plurality of antennas of the antenna array 150. The phase controller 162 may generate the phase control signal C_PS, based on the determined phases, and may provide the phase control signal C_PS to the shifter block 130.

The power controller 164 may provide the power control signal C_PA to the amplifier block 140 in order to control the transmission power. As described above, due to a limited dynamic range of the plurality of power amplifiers A1, A2, . . . , and An, in the case of a signal having a high Peak to Average Power Ratio (PARR), like, in particular, an OFDM signal, it may be difficult to individually control operating points of the plurality of power amplifiers A1, A2, . . . , and An in order to control the transmission power according to the target transmission power. As will be described later with reference to the drawings, in consideration of the limitations of the plurality of power amplifiers A1, A2, . . . , and An, the power controller 164 may activate or deactivate (also referred to herein as "inactivate") each of the plurality of power amplifiers A1, A2, . . . , and An via the power control signal C_PA while maintaining the target transmission power and the first direction D1 of the beam 10. Accordingly, the target transmission power may be satisfied, and power consumption of the wireless communication equipment 100 as well as interference with other transmissions may be reduced or prevented due to a decrease in a difference between the transmission powers and the target transmission power.

The power controller 164 may control activated power amplifiers from among the plurality of power amplifiers A1, A2, . . . , and An with the same power or with different powers. According to some example embodiments, the power controller 164 may generate the power control signal C_PA, based on beam forming, and, for example, a direction and an intensity of the beam 10 may depend on not only phases of the signals determined by the shifter block 130 but also transmission powers of the signals determined by the amplifier block 140. Accordingly, the power controller 164 may control the powers of the plurality of power amplifiers A1, A2, . . . , and An included in the amplifier block 140, based on the first direction D1.

According to some example embodiments, the controller 160 may include at least one core and a memory that stores instructions executed by the core, and at least a portion of the phase controller 162 and/or the power controller 164 may include a software block stored in the memory. According to some example embodiments, the controller 160 may include a logic circuit designed by logic synthesis, and at least a portion of the phase controller 162 and/or the power controller 164 may include a hardware block realized as a logic circuit.

Figure 2:
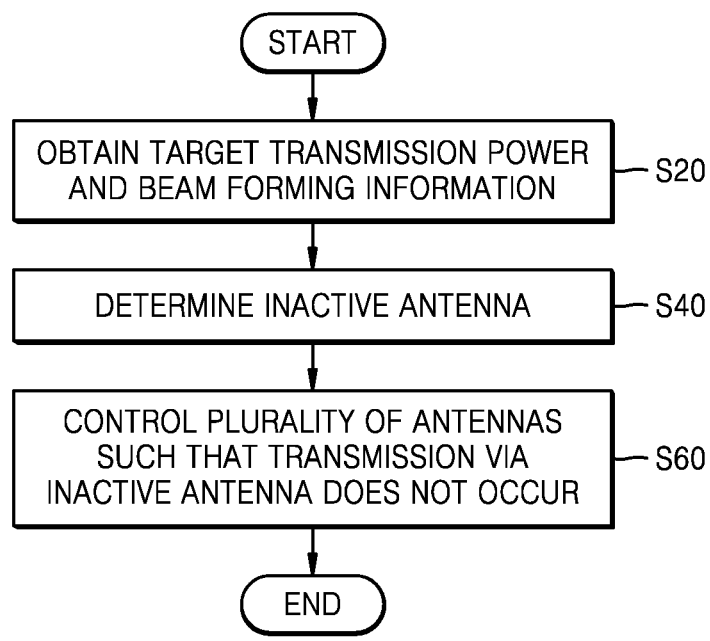
FIG. 2 is a flowchart of a wireless communication method performed by the wireless communication equipment of FIG. 1 according to some example embodiments.

FIG. 2 is a flowchart of a wireless communication method according to some example embodiments. In detail, FIG. 2 illustrates a wireless communication method using an antenna array including a plurality of antennas. According to some example embodiments, the wireless communication method of FIG. 2 may be performed by the controller 160 or the power controller 164 of FIG. 1, and FIG. 2 will now be described with reference to FIG. 1.

In operation S20, target transmission power and beam forming information may be obtained. As will be described later, the target transmission power and the beam forming information may be used by the controller 160 to determine an inactive antenna from among the plurality of antennas of the antenna array 150. The target transmission power may be referred to as the transmission power sufficient for signals output via the plurality of antennas to be received by other wireless communication equipment, and may be obtained in various ways as will be described later with reference to FIG. 3. The beam forming information is information used for forming a beam directed to the opposite wireless communication equipment, and, for example, may include information about phase shifts provided by the plurality of phase shifters S1, S2, . . . , and Sn included in the shifter block 130. According to some example embodiments, the beam forming information may include information about powers of the plurality of power amplifiers A1, A2, . . . , and An included in the amplifier block 140. An illustration of operation S20 will be described later with reference to FIG. 3.

In operation S40, the inactive antenna(s) may be determined. For example, the controller 160 may determine an inactive antenna from among the plurality of antennas of the antenna array 150, based on the obtained target transmission power and the obtained beam forming information. In the present specification, the inactive antenna may be referred to as an antenna that does not output a signal that forms the beam 10, and an active antenna may be referred to as an antenna that outputs the signal that forms the beam 10. In addition, in the present specification, when an antenna is activated, the antenna may be referred to as an active antenna; when an antenna is deactivated, the antenna may be referred to as an inactive antenna. As described above referring to FIG. 1, due to the characteristics of the plurality of power amplifiers A1, A2, . . . , and An respectively corresponding to the plurality of antennas, it may not be easy to control an operating point of each of the plurality of power amplifiers A1, A2, . . . , and An, and, accordingly, the controller 160 may attain the target transmission power by selectively inactivating each of the plurality of antennas, based on the target transmission power and the beam forming information.

When transmission powers P1, P2, . . . , and Pn by the plurality of power amplifiers A1, A2, . . . , and An are given, target transmission power "$P_{target}$" may be calculated using [Equation 1].

$$P_{target} = a_1 P_1 + a_2 P_2 + \ldots + a_n P_n = \Sigma_{i=1}^{n} a_i P_i \quad \text{[Equation 1]}$$

As described above, when each of the plurality of antennas is activated or inactivated by the controller 160, a coefficient "$a_i$" of the transmission powers $P_1, P_2, \ldots,$ and $P_n$ may have a value of "1" or "0". In other words, when "$a_i=1$", this means that an i-th antenna (or an antenna having an index i) has been activated, and, when "$a_i=0$", this means that the i-th antenna has been inactivated. Accordingly, determining inactive antennas from among the plurality of antennas may be similar to or the same as determining a set "I" including indices of the inactive antenna as in [Equation 2].

$$I = \{i | a_i = 0, i = 1, 2, \ldots, n\} \quad \text{[Equation 2]}$$

Illustrations of operation S40 will be described later with reference to FIGS. 4, 5, and 9.

In operation S60, the plurality of antennas may be controlled such that transmission via the inactive antenna does not occur. For example, the controller 160 may control a power amplifier corresponding to the inactive antenna such that transmission via the inactive antenna does not occur. According to some example embodiments, the controller 160 may block power that is provided to the power amplifier corresponding to the inactive antenna, via the power control signal C_PA, and may disable an output of the power amplifier corresponding to the inactive antenna. Accordingly, when at least one inactive antenna is determined in operation S40, signals may be output via antennas from among the plurality of antennas except for the at least one inactive antenna, namely, via active antennas, and the output signals may form the beam 10.

Figure 3:
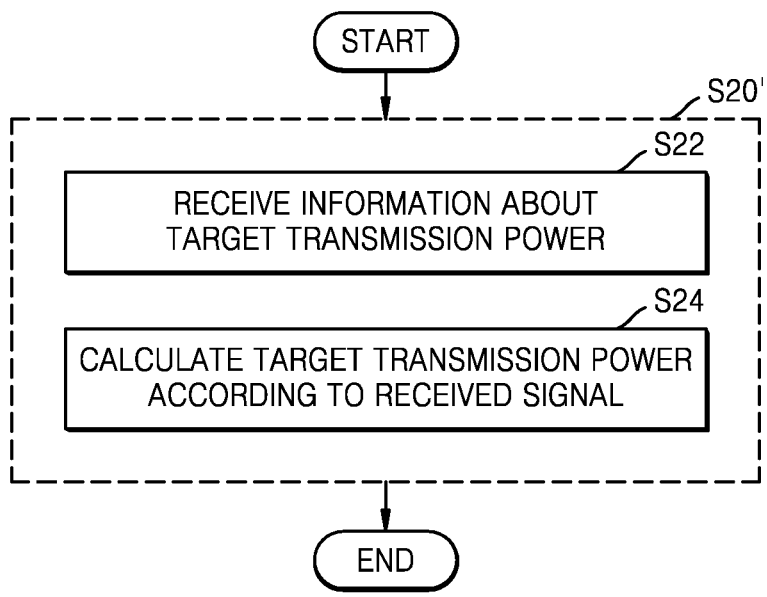
FIG. 3 is a flowchart of an example of operation S20 of FIG. 2, according to some example embodiments.

FIG. 3 is a flowchart of operation S20', which is an illustration of operation S20 of FIG. 2, according to some example embodiments. As described above referring to FIG. 2, in operation S20' of FIG. 3, the target transmission power and the beam forming information may be obtained. In detail, FIG. 3 illustrates an example of obtaining the target transmission power. According to some example embodiments, differently from FIG. 3, operation S20' may include only one of operations S22 and S24. FIG. 3 will now be described with reference to FIG. 1.

In operation S22, information about the target transmission power may be received. In other words, the wireless communication equipment 100 may receive a signal including the information about the target transmission power from the opposite wireless communication equipment, via the antenna array 150, and may control transmission power according to the received information. For example, when the wireless communication equipment 100 is user equipment (UE), a base station (BS) as the opposite wireless communication equipment may provide transmission power for uplink as the target transmission power information to the wireless communication equipment 100. When the wireless communication equipment 100 is a BS, a UE as the opposite wireless communication equipment may request the BS for transmission power for downlink in order to properly process a signal received via downlink, and the BS may have the transmission power of the request as the target transmission power information.

In operation S24, the target transmission power may be calculated according to the received signal. In other words, the wireless communication equipment 100 may determine a status of a wireless channel, based on the signal received from the opposite wireless communication equipment via the antenna array 150, and may calculate the target transmission power, based on the determined status. For example, when the wireless communication equipment 100 is a UE, the UE may calculate transmission power for uplink, based on the quality of the signal received via the downlink, and the calculated transmission power may be used as the target transmission power by the UE. When the wireless communication equipment 100 is a BS, UEs as the opposite wireless communication equipment may request the BS for transmission powers for a downlink, and the BS may calculate respective target transmission powers for the UEs, based on the quality of the corresponding requests.

According to some example embodiments, operations S22 and S24 may be combined and performed. For example, the wireless communication equipment 100 may receive target transmission power from the opposite wireless communication equipment and evaluate the quality of a signal received from the opposite wireless communication equipment. The wireless communication equipment 100 may calculate target transmission power, which is the transmission power of a signal that is to be transmitted to the opposite wireless communication equipment, based on not only the received target transmission power information but also the quality of the received signal.

Figure 4:
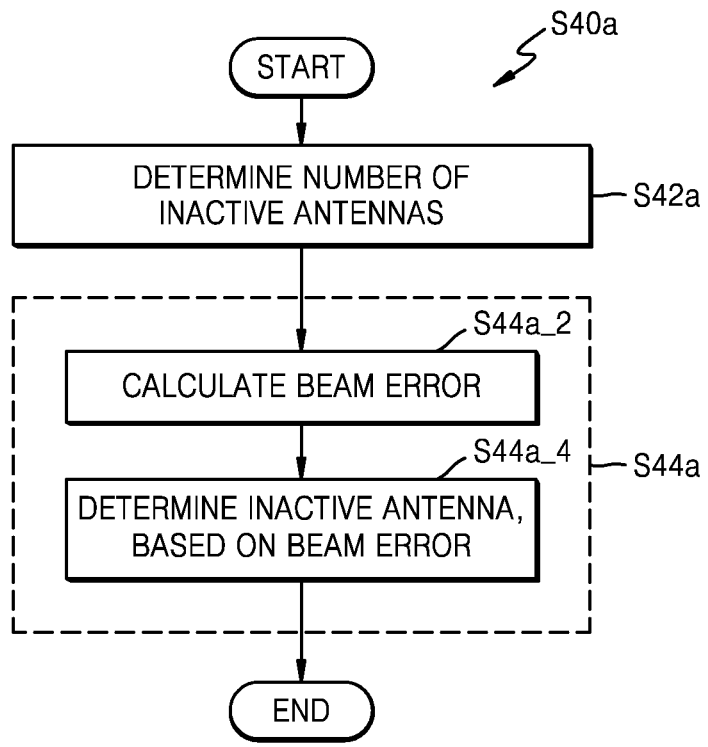
FIG. 4 is a flowchart of an example of operation S40 of FIG. 2 for determining the inactive antenna(s) by deriving set I, according to some example embodiments.

FIG. 4 is a flowchart of operation S40a, which is an illustration of operation S40 of FIG. 2, according to some example embodiments. FIG. 5 is a graph showing an example of a result of calculating a beam error according to some example embodiments. In detail, FIG. 4 illustrates examples of operation S40 of FIG. 2 when active antennas from among the plurality of antennas included in the antenna array 150 of FIG. 1 are controlled to output signals having a similar transmission power or the same transmission power. FIG. 5 shows a result of calculating beam errors corresponding to all cases where two antennas in an antenna array including 8 antennas are inactivated. FIGS. 4 and 5 will now be described with reference to FIG. 1.

Referring to FIG. 4, in operation S40a, as described above with reference to FIG. 2, an inactive antenna may be determined based on the target transmission power and the beam forming information. In detail, the inactive antenna may be determined by calculating a beam error. Referring to FIG. 4, operation S40a may include operation S42a and operation S44a, and operation S44a may include operation S44a_2 and operation S44a_4.

In operation S42a, the number of inactive antennas may be determined. Because active antennas are controlled to output signals having a similar transmission power or the same transmission power, the number of inactive antennas (or the number of active antennas) may be calculated from the target transmission power and the transmission powers of the active antennas. When the plurality of antennas of the antenna array 150 are all active antennas, the plurality of transmission powers $P_1, P_2, \ldots,$ and $P_n$ by the plurality of power amplifiers A1, A2, . . . , and An may be the same, which is "$P_{uniform}$", as in [Equation 3].

$$P_{uniform} = P_1 = P_2 = \ldots = P_n \qquad \text{[Equation 3]}$$

The number of inactive antennas, "m", may be calculated using [Equation 4].

$$m = n - \frac{P_{target}}{P_{uniform}} \qquad \text{[Equation 4]}$$

When "m" is not an integer in [Equation 4], "m" may be rounded off according to some example embodiments. According to some example embodiments, "m" may be rounded up or down according to the type of to-be-transmitted information, the type of service, and a link budget. For example, when the to-be-transmitted information is control information, "m" may be rounded down to secure sufficient transmission power. The value of "m" turned into an integer may be similar to or the same as the number of elements of the set "I" of [Equation 2].

Next, in operation S44a, the inactive antenna(s) may be determined based on the beam error. The beam error may be referred to as a value calculated from a difference between two beam gains. First, in operation S44a_2, the beam error may be calculated. The beam error may be calculated from a first beam gain G1 based on the beam forming information and a second beam gain G2 based on inactive antennas, the number of which has been determined in operation S42a. As described above with reference to FIG. 2, the beam forming information may include information about the phase shifts provided by the plurality of phase shifters S1, S2, . . . , and Sn of the shifter block 130. The phase shifts may be expressed as beam forming coefficients, respectively, and, when the beam forming coefficients are defined as an n-dimensional vector "B", a beam gain "G(θ, B)" to an angle "θ" may be defined as in [Equation 5] below.

$$G(\theta, B) = |D_n^H(\theta) B| \qquad \text{[Equation 5]}$$

In [Equation 5], "$D_n^H(\theta)$" may be an Hermitian transpose of a response vector "$D_n(\theta)$", and, when a structure of the antenna array 150 is a uniform linear array (ULA) in which an interval between antennas is a half wavelength, the response vector "$D_n(\theta)$" may be expressed as in [Equation 6] below.

$$D_n(\theta) = \frac{1}{n}[1 \ e^{j\theta} \ \ldots \ e^{j(n-1)\theta}]^T \qquad \text{[Equation 6]}$$

Based on [Equation 5] and [Equation 6], when a first beam gain "$G_1(\theta, B_1)$" is derived from a first vector "$B_1$" based on the beam forming information and a second beam gain "$G_2(\theta, B_2)$" is derived from a second vector "$B_2$" based on the inactive antennas, the number of which has been determined in operation S42a, a beam error "E" between the first beam gain $G_1$ and the second beam gain G2 may be calculated using [Equation 7] below, for example, when the plurality of antennas are arranged in a row.

$$E = \int_{-\pi}^{\pi} |G_1(\theta, B_1) - G_2(\theta, B_2)|^2 d\theta \qquad \text{[Equation 7]}$$

As in [Equation 7], the beam error E may be calculated by integrating a difference between the first beam gain $G_1$ and the second beam gain $G_2$ in a beam space. According to some example embodiments, the beam error E may be calculated by integrating the difference between the first beam gain $G_1$ and the second beam gain $G_2$ in a restricted space. For example, as in [Equation 8] below, the beam error E may be calculated in a beam space defined as a range which is between second and third directions and includes the first direction D1 of a beam, namely, within an angle range ($\varphi_1$ to $\varphi_2$) including the first angle ($\theta_1$).

$$E = \int_{\varphi_1}^{\varphi_2} |G_1(\theta, B_1) - G_2(\theta, B_2)|^2 d\theta \, (\varphi_1 \leq \theta_1 \leq \varphi_2) \qquad \text{[Equation 8]}$$

According to some example embodiments, the beam error E may be derived from a beam space configured with quantized directions. For example, the beam error E based on quantized directions "$\{\theta_q\}_{q=1}^Q$" may be calculated using [Equation 9] below.

$$E = \sum_{q=1}^{Q} |G_1(\theta_q, B_1) - G_2(\theta_q, B_2)|^2 \qquad \text{[Equation 9]}$$

Figure 5:
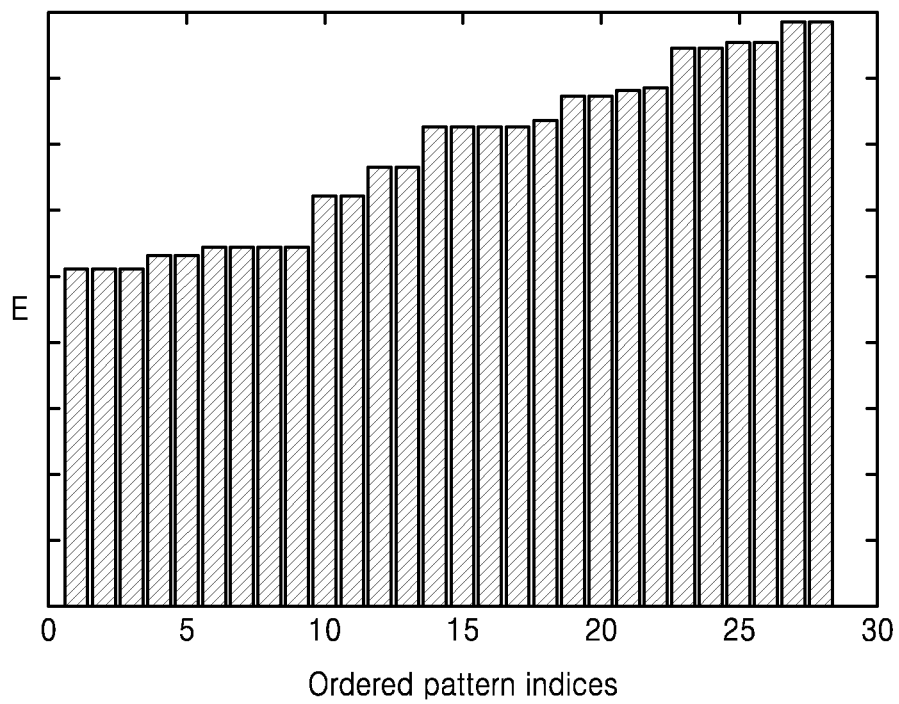
FIG. 5 is a graph showing a result of calculating a beam error according to some example embodiments.

Referring to FIG. 5, the beam error E may be calculated from each of 28 patterns in which two antennas in an antenna array including 8 antennas are deactivated. As shown in FIG. 5, patterns of inactive antennas having a similar beam error or the same beam error may be grouped.

Referring back to FIG. 4, according to some example embodiments, the controller 160 may calculate the beam error E, based on [Equation 7], [Equation 8], and/or [Equation 9]. For example, the controller 160 may calculate a plurality of beam errors according to possible patterns of the inactive antennas, the number of which has been determined in operation S42a.

In operation S44a_4, the inactive antenna may be determined based on the beam error. When the beam error E is calculated using [Equation 7], [Equation 8], and/or [Equation 9], determining an inactive antenna may mean deriving the set "I" of [Equation 10] below.

$$I = \text{argmin } E \text{ subject to } I \subset \{1, 2, \ldots, n\}, |I| = m \qquad \text{[Equation 10]}$$

According to some example embodiments, the controller 160 may calculate a plurality of beam errors according to possible patterns of the inactive antennas, the number of which has been determined in operation S42a, and may determine the inactive antenna by detecting the set "I" that provides the lowest beam error from among the plurality of beam errors. Examples of the set "I" will be described later with reference to FIG. 7A.

Figure 6:
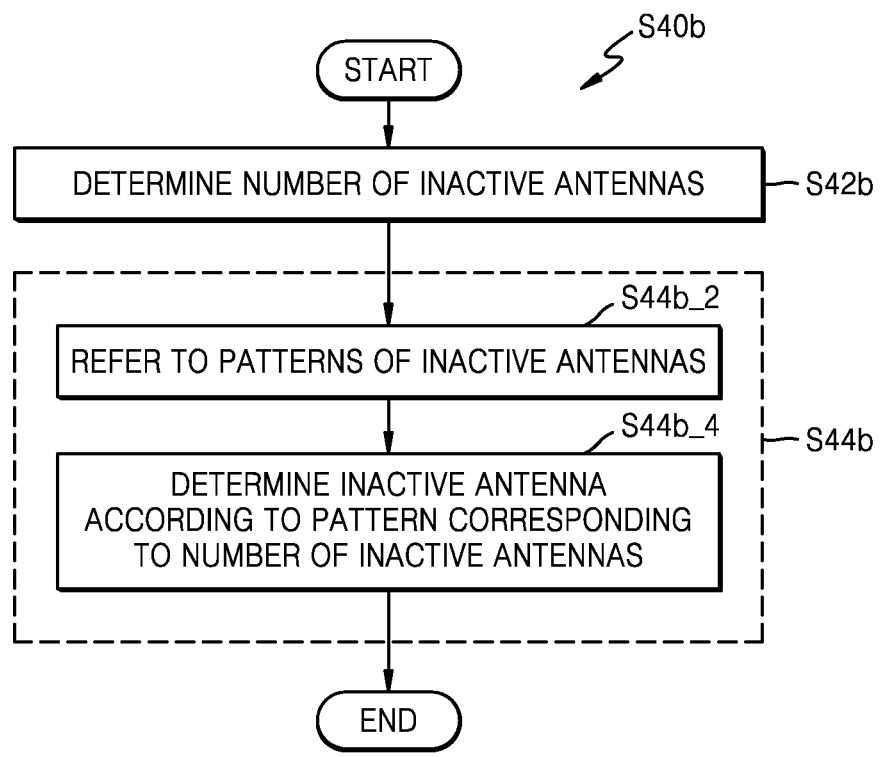
FIG. 6 is a flowchart of an example of operation S40 of FIG. 2 for determining the inactive antenna(s) according to patterns of inactive antennas, according to some example embodiments.
Figure 7B:
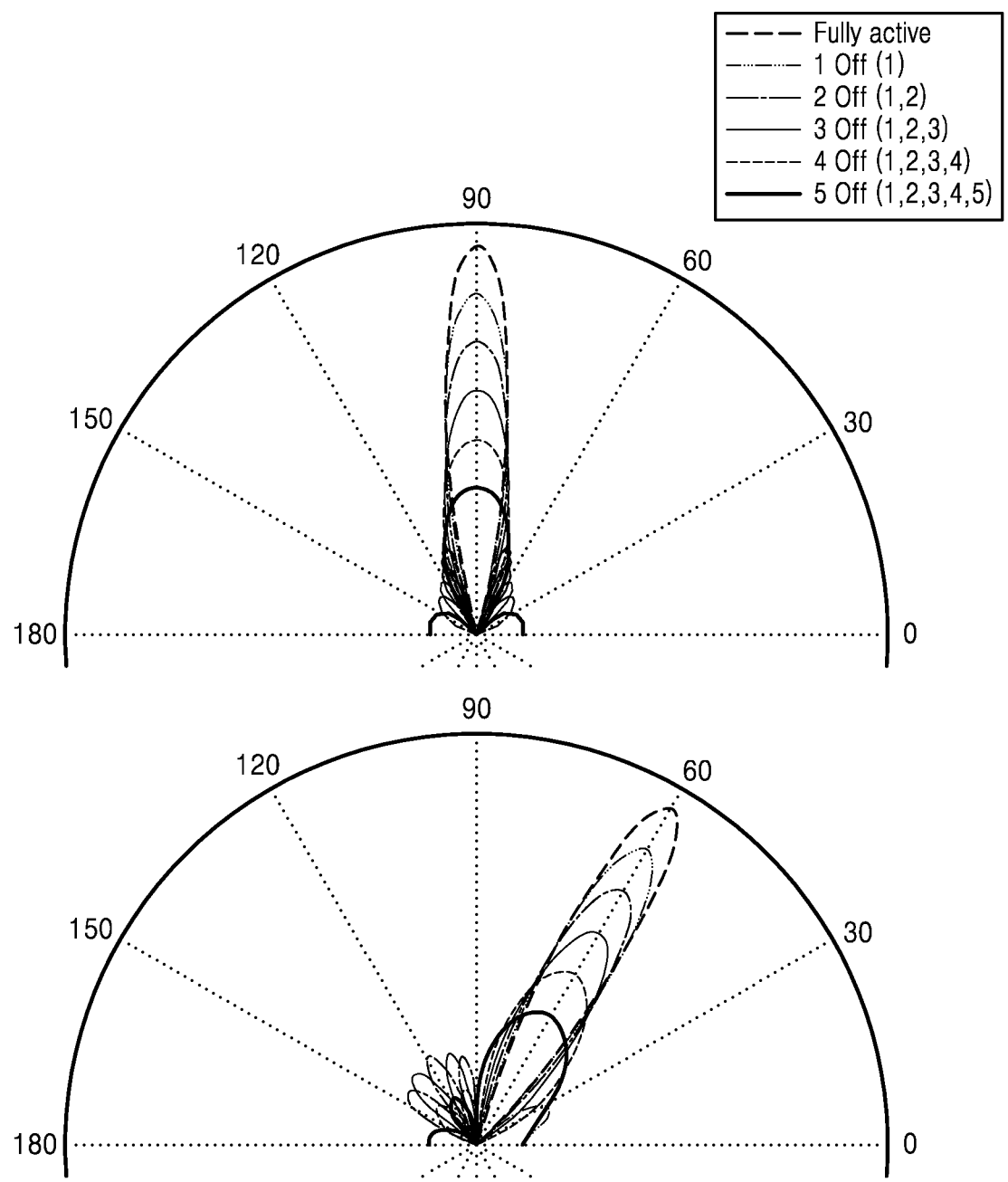

FIG. 6 is a flowchart of operation S40b, which is an example of operation S40 of FIG. 2, according to some example embodiments. FIGS. 7A and 7B illustrate patterns of inactive antennas and beams based on the patterns according to some example embodiments. In detail, FIG. 6 illustrates operation S40b, which is an example of operation S40 of FIG. 2, when active antennas from among the plurality of antennas included in the antenna array 150 of FIG. 1 are controlled to output signals having similar transmission power or the same transmission power. FIG. 7A illustrates antenna patterns that provide the lowest beam error according to the number of inactive antennas in an antenna array including 8 antennas, and FIG. 7B illustrates beams according to patterns of inactive antennas. A description of FIG. 6 that is the same as given above with reference to FIG. 4 will not be repeated herein, and FIGS. 6, 7A, and 7B will be described with reference to FIG. 1.

Referring to FIG. 6, in operation S40b, as described above with reference to FIG. 2, an inactive antenna(s) may be determined based on the target transmission power and the beam forming information. In detail, the inactive antenna may be determined by referring to patterns of inactive antennas. Referring to FIG. 6, operation S40b may include operation S42b and operation S44b, and operation S44b may include operation S44b_2 and operation S44b_4.

In operation S42b, the number of inactive antennas may be determined. For example, the number of inactive antennas, "m", may be calculated using [Equation 4]. Next, in operation S44b, the inactive antenna(s) may be determined by referring to the patterns of inactive antennas.

In operation S44b_2, the patterns of inactive antennas may be referred to. For example, the controller 160 may include a memory that stores information about the patterns of inactive antennas, or may access the memory. According to some example embodiments, the patterns of inactive antennas may be previously defined based on the beam error. For example, as shown in FIG. 7A, the patterns of inactive antennas providing the lowest beam error may be previously defined according to the number of inactive antennas.

In operation S44b_4, the inactive antenna(s) may be determined according to a pattern corresponding to the number of inactive antennas. The controller 160 may search for patterns corresponding to the number of inactive antennas determined in operation S42b from among the patterns of inactive antenna. For example, when the number of inactive antennas determined in operation S42b is 2, three patterns in which pairs of antenna indices (1, 2), (1, 8), and (7, 8) are inactivated may be found, and one of three patterns providing a similar beam error or the same beam error may be selected. For example, as will be described later with reference to FIG. 13, the controller 160 may select one from among the three patterns, based on blockage information about the plurality of antennas.

Referring to FIG. 7A, patterns of inactive antennas in a given number of inactive antennas may correspond to one or more defined rules. For example, some rules may include at least one outermost antenna from among the 8 antennas being determined as inactive antennas, and inactive antennas being consecutively determined starting from the at least one outermost antenna. In other words, at least one consecutive inactive antenna may include the outermost antenna. According to the rule of the patterns of inactive antennas, in some example embodiments, the controller 160 may determine an inactive antenna, by applying conditions to the one or more rules derived from the patterns, instead of referring to patterns of inactive antennas stored in the memory. Referring to FIG. 7B, an experiment result shows that, when antennas from an antenna with an index 1 as an outermost antenna to an antenna with an index 5 are sequentially inactivated, transmission powers of formed beams decrease, but directions thereof are maintained.

Figure 8:
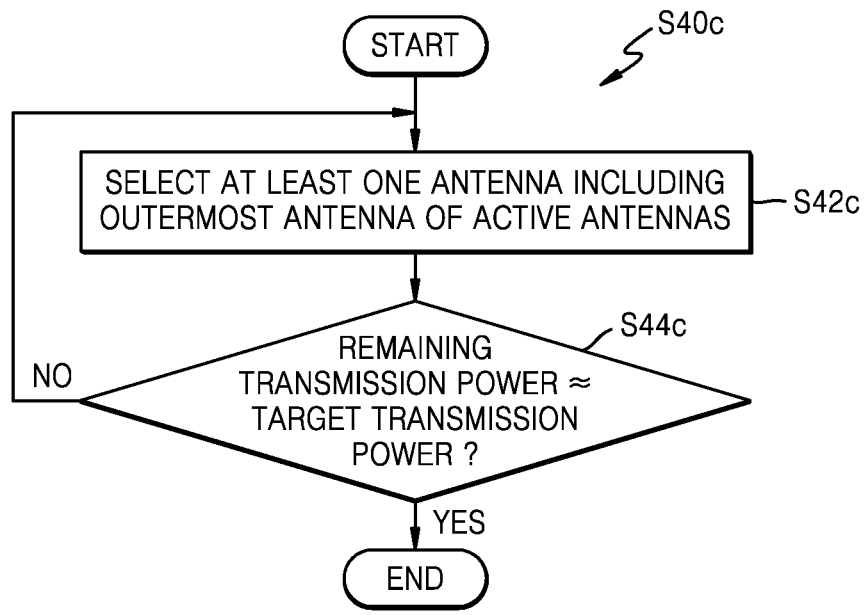
FIG. 8 is a flowchart of an example of operation S40 of FIG. 2 when the antennas output signals of different transmission powers, according to some example embodiments.
Figure 10:
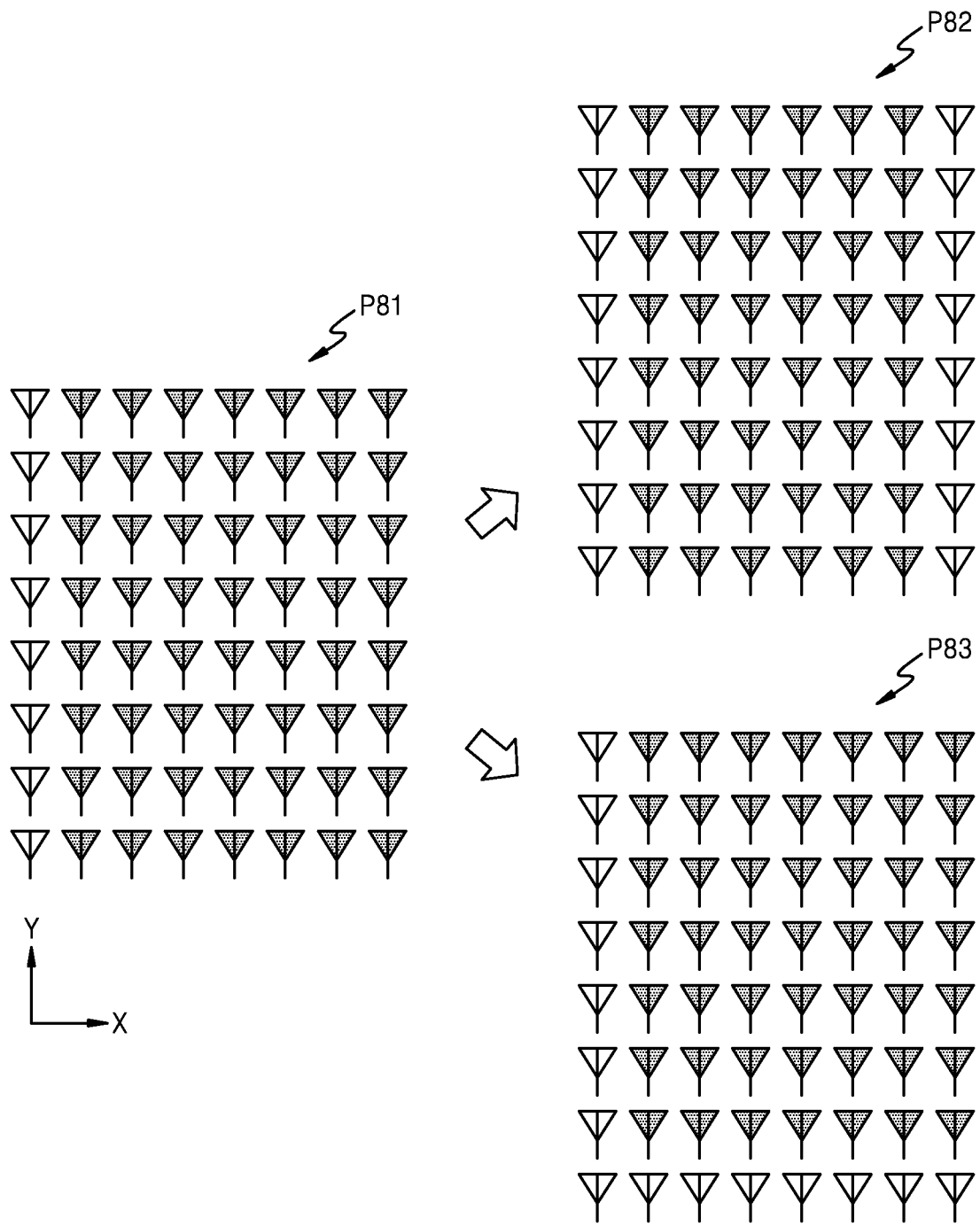
Figure 11:
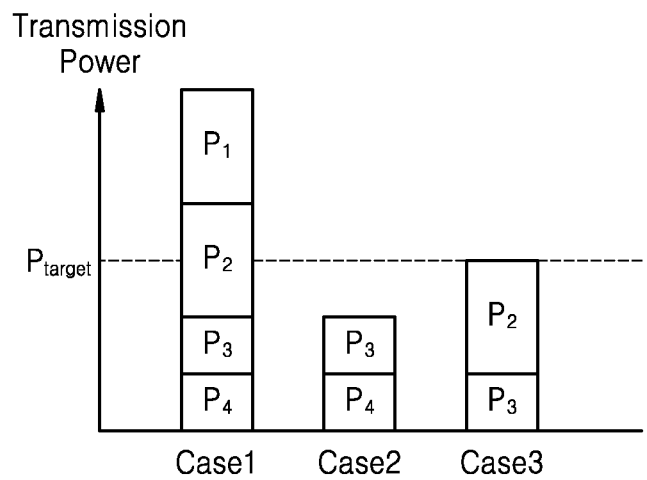

FIG. 8 is a flowchart of operation S40c, which is an example of operation S40 of FIG. 2, according to some example embodiments. FIGS. 9, 10, and 11 illustrate examples in which an inactive antenna is determined, according to some example embodiments. In detail, FIG. 8 illustrates an example of operation S40 of FIG. 2 when the plurality of antennas included in the antenna array 150 of FIG. 1 are controlled to output signals having different transmission powers. FIGS. 9 and 10 illustrate examples of a process in which inactive antennas are sequentially determined, and FIG. 11 illustrates variations in transmission power when two antennas are inactivated. FIG. 8 will now be described with reference to FIG. 1.

Referring to FIG. 8, in operation S40c, as described above with reference to FIG. 2, an inactive antenna(s) may be determined based on the target transmission power and the beam forming information, and the beam forming information may include not only the phase shifts provided by the plurality of phase shifters S1, S2, . . . , and Sn of the shifter block 130 but also the transmission powers provided by the plurality of power amplifiers A1, A2, . . . , and An of the amplifier block 140 in order to perform beam forming. FIGS. 8 through 11 will now be described with reference to FIG. 1.

Referring to FIG. 8, in operation S40c, as described above with reference to FIG. 2, an inactive antenna(s) may be determined based on the target transmission power and the beam forming information, and both a location of the inactive antenna(s) and the target transmission power may be considered. For example, the controller 160 may sequentially determine inactive antennas until the target transmission power is achieved. Referring to FIG. 8, operation S40c may include operations S42c and S44c.

In operation S42c, at least one antenna including an outermost antenna from among active antennas may be selected. As described above with reference to FIG. 7A, when the number of inactive antennas is given, patterns of inactive antennas providing the lowest beam error may include an outermost antenna as an inactive antenna. Accordingly, while inactive antennas are being sequentially determined, at least one antenna including an outermost antenna from among the remaining active antennas may be selected as an inactive antenna. According to some example embodiments, when the plurality of antennas of the antenna array 150 are arranged in a row, active antennas may include two outermost antennas. On the other hand, when the plurality of antennas are arranged on a 2D plane, the active antennas may include a plurality of outermost antennas on each of up, down, left, and right sides, as shown in FIG. 10.

The controller 160 may select at least one antenna including an outermost antenna, based on the target transmission power. According to some example embodiments, the controller 160 may select at least one outermost antenna that provides transmission power closest to the target transmission power during inactivation, namely, remaining transmission power, from among a plurality of outermost antennas. For example, as will be described later with reference to FIG. 9, the controller 160 may select one outermost antenna that provides transmission power closest to the target transmission power during inactivation from among active antennas.

According to some example embodiments, the controller 160 may take combinations of outermost antennas and antennas close to the outermost antennas into consideration, and an antenna that provides transmission power closest to the target transmission power may be selected. For example, when an inactive antenna is selected from 8 antennas arranged in a row as shown in FIG. 7A, the pairs of inactive antennas (1, 2), (1, 8), and (7, 8) representing patterns including not only first and eighth antennas, being outermost antennas at first, but also two inactive antennas may be all considered, and accordingly the controller 160 may select at least one inactive antenna based on a pattern that provides transmission power closest to the target transmission power from among 3 patterns.

In operation S44c, the remaining transmission power may be compared with the target transmission power. The remaining transmission power may be referred to as transmission power based on active antennas, when antennas determined as inactive antennas iteratively in operation S42c are inactivated. According to some example embodiments, it may be determined whether the remaining transmission power is within a determined difference from the target transmission power. When the remaining transmission power is within the determined difference from the target transmission power, operation S40c may be terminated. Otherwise, operation S42c may be performed. According to some example embodiments, it may be determined whether the remaining transmission power is equal to or greater than the target transmission power. When the remaining transmission power is equal to or greater than the target transmission power, operation S42c may be performed. Otherwise, operation S40c may be terminated. According to some example embodiments, when it is determined in operation S44c that the remaining transmission power is lower than the target transmission power, the at least one antenna selected in operation S42c may be determined again as an active antenna before operation S40c is terminated, such that the transmission power is maintained to be equal to or greater than the target transmission power.

Figure 9:
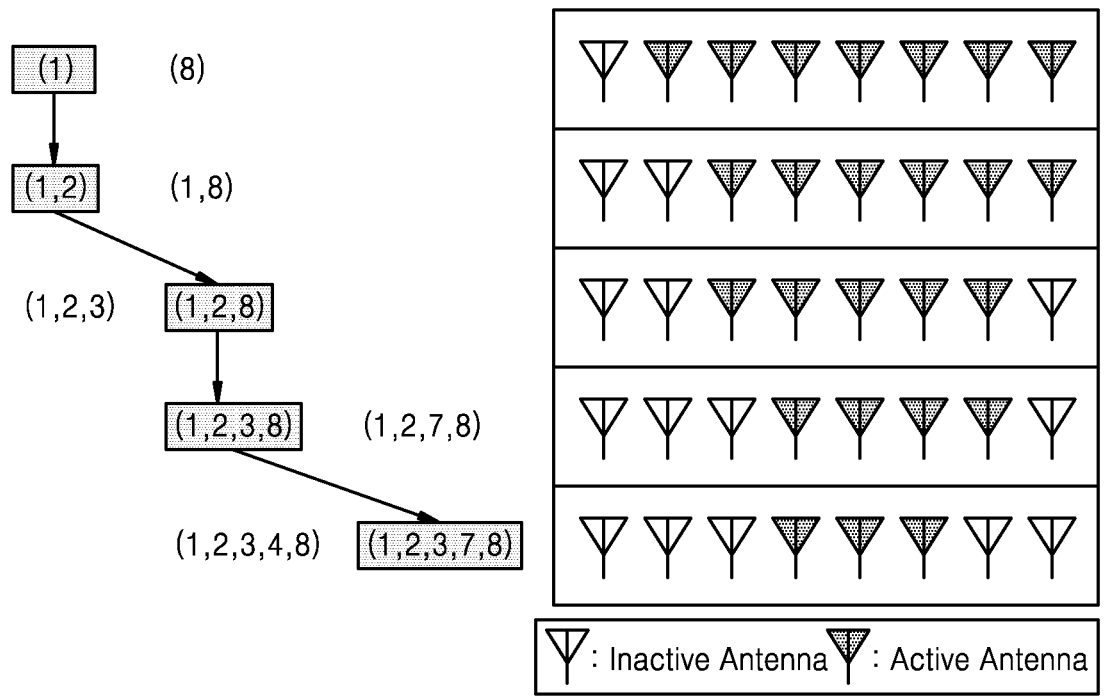
FIGS. 9, 10, and 11 illustrate examples in which an inactive antenna is determined, according to some example embodiments.

Referring to FIG. 9, in an antenna array including 8 antennas arranged in a row, inactive antennas may be sequentially determined in consideration of target transmission power and beam forming. As shown in FIG. 9, a first antenna that provides transmission power closer to the target transmission power during inactivation from among first and second antennas being outermost antennas may be selected. Next, the second antenna, being the outermost antenna, from among the second through eighth antennas being the remaining active antennas, may be selected. Similarly, the eighth antenna, the third antenna, and the seventh antenna may be sequentially selected.

Referring to FIG. 10, an antenna array may include a plurality of antennas arranged on a 2D plane, and outermost antennas from among the plurality of antennas may include antennas arranged in a row. For example, as shown in FIG. 10, in a plurality of antennas arranged along an X axis and a Y axis, a series of antennas arranged parallel to a Y-axis direction may be selected as inactive antennas, as in a first pattern P81. Next, based on the target transmission power, a series of antennas arranged parallel to the Y-axis direction may be selected as inactive antennas, as in a second pattern P82, or a series of antennas arranged parallel to an X-axis direction may be selected as inactive antennas, as in a third pattern P83.

Referring to FIG. 11, a difference between the transmission power and the target transmission power may be reduced or eliminated by considering both the location of an antenna, namely, the index of the antenna, and the target transmission power in operation S40c of FIG. 8. As in a first case of FIG. 11, when first through fourth antennas may have first through fourth transmission powers $P_1$ through $P_4$ and a sum of the first through fourth transmission powers $P_1$ through $P_4$ is greater than a target transmission power $P_{target}$, at least one antenna may be inactivated. For example, as in a second case of FIG. 11, when only the location of an antenna is considered during determination of inactive antennas, the first and second antennas may be determined as inactive antennas, and transmission power based on this determination is a sum of the third and fourth transmission powers $P_3$ and $P_4$ of the third and fourth antennas being active antennas, and thus may have a relatively large difference from the target transmission power $P_{target}$. On the other hand, as in a third case of FIG. 11, when both the location of an antenna and the target transmission power $P_{target}$ are considered during determination of inactive antennas, the first and fourth antennas may be determined as inactive antennas, and transmission power based on this determination is a sum of the second and third transmission powers $P_2$ and $P_3$ of the second and third antennas being active antennas and thus may approximate to the target transmission power $P_{target}$. In other words, as described above with reference to FIG. 9, in the first case of FIG. 11, the first antenna having the first transmission power $P_1$ may be selected as an inactive antenna from among the first and fourth antennas being the outermost antennas in order to provide remaining transmission power closer to the target transmission power $P_{target}$ during inactivation, and then the fourth antenna having the fourth transmission power $P_4$ may be selected as an inactive antenna from among the second and fourth antennas being the outermost antennas in order to provide remaining transmission power closer to the target transmission power $P_{target}$ during inactivation.

Figure 12:
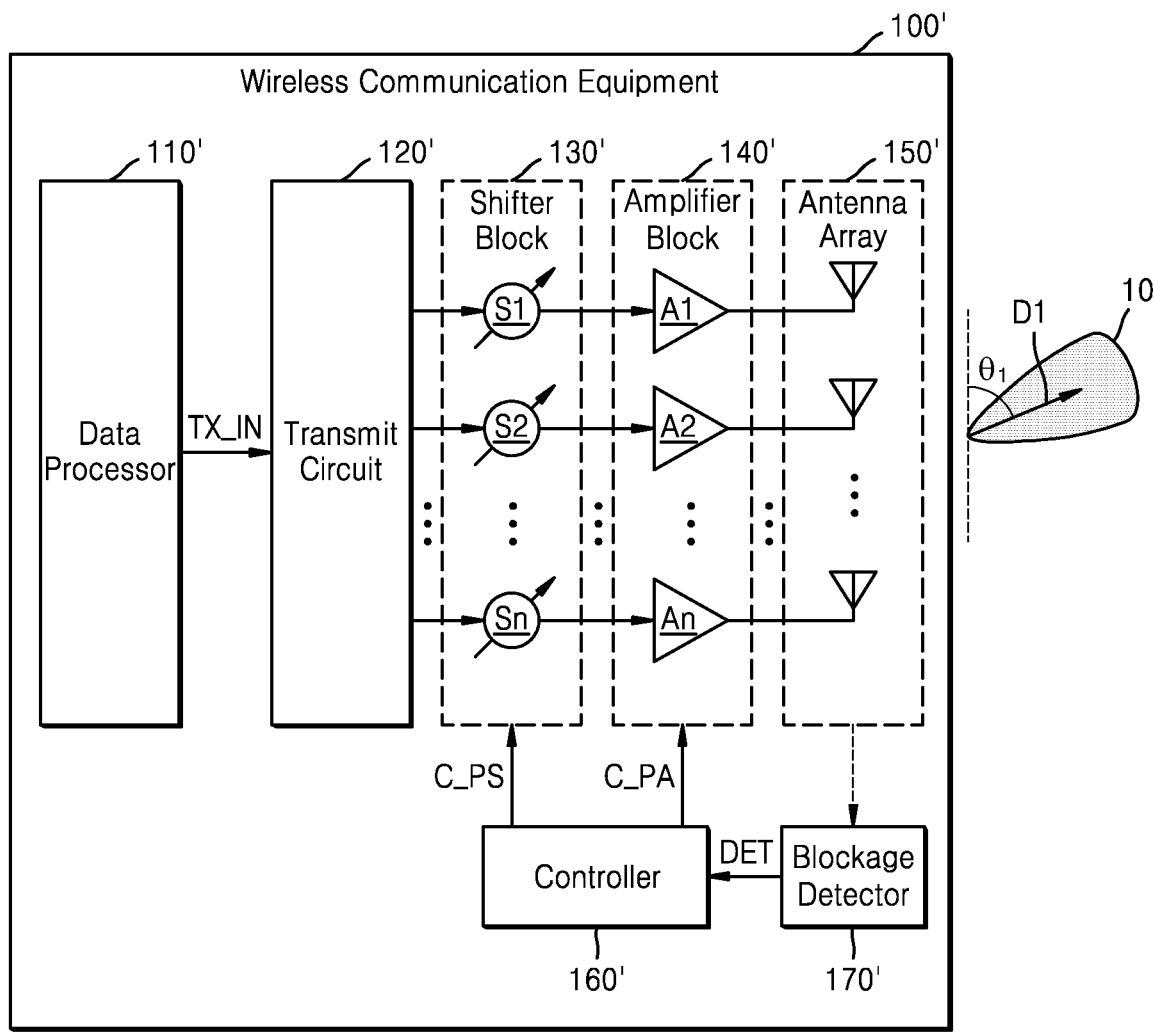
FIG. 12 is a block diagram of wireless communication equipment including a blockage detector according to some example embodiments.
Figure 13:
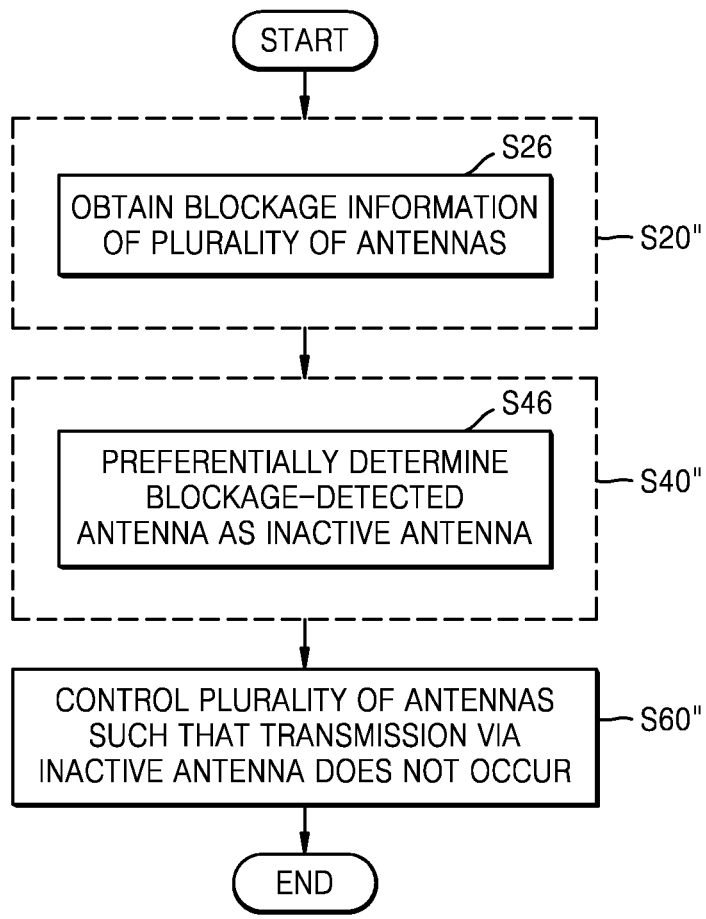
FIG. 13 is a flowchart of a wireless communication method performed by the wireless communication equipment of FIG. 12, according to some example embodiments.

FIG. 12 is a block diagram of wireless communication equipment 100' according to some example embodiments. FIG. 13 is a flowchart of a wireless communication method performed by the wireless communication equipment 100', according to some example embodiments. Similar to the wireless communication equipment 100 of FIG. 1, the wireless communication equipment 100' may include a data processor 110', a transmit circuit 120', a shifter block 130', an amplifier block 140', an antenna array 150', and a controller 160'. The wireless communication equipment 100' may further include a blockage detector 170'. A description of FIGS. 12 and 13 that is the same as given above with reference to FIGS. 1 and 2 will not be repeated herein. According to some example embodiments, operations described herein as being performed by the blockage detector 170' may be performed by at least one processor executing program code that includes instructions corresponding to the operations. The instructions may be stored in a memory. The term 'processor,' as used in the present disclosure, may refer to, for example, a hardware-implemented data processing device having circuitry that is physically structured to execute desired operations including, for example, operations represented as code and/or instructions included in a program. In at least some example embodiments the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA).

According to some example embodiments, each of a plurality of antennas of the antenna array 150' may be selectively inactivated based on not only the target transmission power and the beam forming information but also blockage information. In other words, to attain the target transmission power, it may be more favorable to inactivate an antenna where blockage has occurred than an antenna where no blockage has occurred from among the plurality of antennas. In the wireless communication equipment 100', the plurality of antennas of the antenna array 150' may be exposed to the outside of the wireless communication equipment 100' or may be arranged adjacent to an outer surface of the wireless communication equipment 100', and a signal output by an antenna may be reduced or prevented due to blockage. Blockage with respect to an antenna may occur due to various causes. For example, blockage with respect to an antenna may occur due to an external object close to the antenna array 150' outside the wireless communication equipment 100', such as by a human body or a conductive material.

The blockage detector 170' may detect blockage generated in each of the plurality of antennas included in the antenna array 150'. According to some example embodiments, the blockage detector 170' may output a test signal via the plurality of antennas and may detect the blockages, based on response characteristics based on the outputting. According to some example embodiments, the blockage detector 170' may detect the blockages by measuring impedance on the outer surface of the wireless communication equipment 100'. According to some example embodiments, the blockage detector 170' may detect the blockages by detecting states of the outer surface of the wireless communication equipment 100', for example, a pressure and a temperature of the outer surface. The blockage detector 170' may generate a blockage detection signal DET including blockage information, based on the detected blockages, and may provide the blockage detection signal DET to the controller 160'. The controller 160' may generate the power control signal C_PA, based on not only the target transmission power and the beam forming information but also the blockage information included in the blockage detection signal DET received from the blockage detector 170'.

Referring to FIG. 13, similar to operation S20 of FIG. 2, in operation S20'', the target transmission power and the beam forming information may be obtained, and the blockage information may be further obtained. In operation S40'', an inactive antenna may be determined. In operation S60'', a plurality of antennas may be controlled such that transmission via the inactive antenna does not occur. Referring to FIG. 13, operation S20'' may include operation S26, and operation S40'' may include operation S46.

In operation S26, blockage information of the plurality of antennas may be obtained. For example, as described above with reference to FIG. 12, the blockage detector 170' may generate the blockage detection signal DET including the blockage information by detecting blockages generated in the plurality of antennas of the antenna array 150', and the controller 160' may obtain the blockage information by receiving the blockage detection signal DET.

In operation S46, a blockage-detected antenna may be determined as an inactive antenna. According to some example embodiments, as described above with reference to FIG. 4, the controller 160' may calculate a beam error, and may determine, as the inactive antenna, the blockage-detected antenna from among a plurality of antennas that provide a similar beam error or the same beam error during inactivation. According to some example embodiments, as described above with reference to FIG. 6, the controller 160' may refer to patterns of inactive antennas, and may select a pattern including the blockage-detected antenna as an inactive antenna from among a plurality of patterns that provide a similar beam error or the same beam error. According to some example embodiments, as described above with reference to FIG. 8, the controller 160' may sequentially select inactive antennas, and may select, as an inactive antennas, a blockage-detected antenna from among outermost antennas that provide transmission power similar to or the same as the target transmission power during inactivation. Accordingly, the target transmission power may be attained, and an influence of blockage with respect to beam forming may be reduced or prevented.

Figure 14:
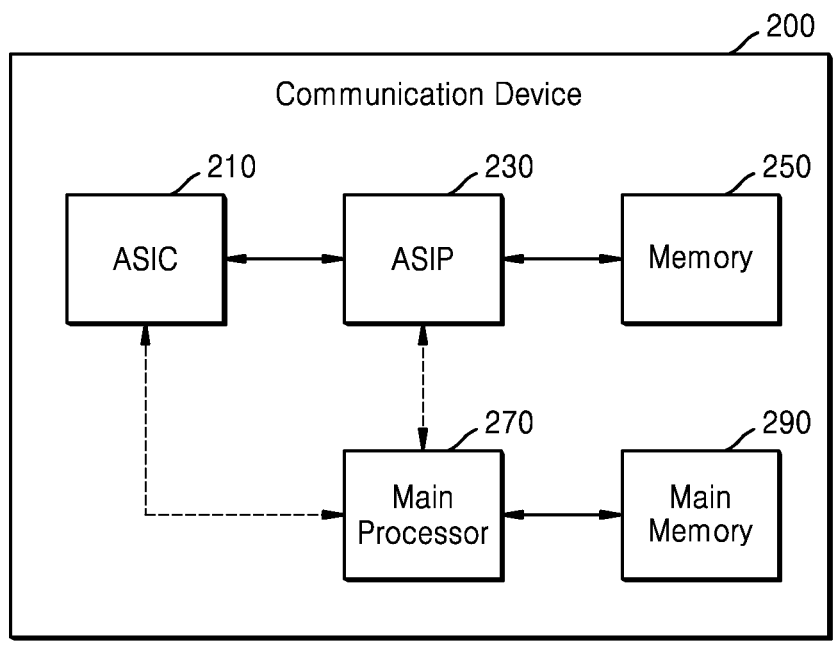
FIG. 14 is a block diagram of a communication device according to some example embodiments.

FIG. 14 is a block diagram of a communication device 200 according to some example embodiments. According to some example embodiments, the communication device 200 may be included in the wireless communication equipment 100 of FIG. 1, and may perform an operation of the controller 160 of FIG. 1.

As shown in FIG. 14, the communication device 200 may include an Application Specific Integrated Circuit (ASIC) 210, an Application Specific Instruction set Processor (ASIP) 230, a memory 250, a main processor 270, and a main memory 290. At least two of the ASIC 210, the ASIP 230, and the main processor 270 may communicate with each other. At least two of the ASIC 210, the ASIP 230, the memory 250, the main processor 270, and the main memory 290 may be embedded into one chip.

The ASIP 230 may be an integrated circuit customized for an application. The ASIP 230 may support an instruction set only for a certain application and may execute instructions included in the instruction set. The memory 250 may communicate with the ASIP 230 and may store, as a non-transitory storage, the instructions executed by the ASIP 230. For example, as a non-limiting example, the memory 250 may include an arbitrary type of memory accessed by the ASIP 230, for example, Random Access Memory (RAM), Read Only Memory (ROM), a tape, a magnetic disk, an optical disk, a volatile memory, a non-volatile memory, and a combination thereof.

The main processor 270 may execute the instructions and thus may control the communication device 200. For example, the main processor 270 may control the ASIC 210 and the ASIP 230 and may process data received via a wireless communication network or a user input to the communication device 200. The main memory 290 may communicate with the main processor 270 and may store, as a non-transitory storage, the instructions executed by the main processor 270. For example, as a non-limiting example, the main memory 290 may include an arbitrary type of memory accessed by the main processor 270, for example, RAM, ROM, a tape, a magnetic disk, an optical disk, a volatile memory, a non-volatile memory, and a combination thereof.

The above-described wireless communication method according to some example embodiments may be performed by at least one of the components included in the communication device 200 of FIG. 14. According to some example embodiments, at least one of the operations of the wireless communication method, and operations of the controller 160 (or the power controller 164) of FIG. 1 may be realized as the instructions stored in the memory 250. Accordingly, the ASIP 230 may perform at least one of the operations of the wireless communication method or at least some of the operations of the controller 160 (or the power controller 164) of FIG. 1 by executing the instructions stored in the memory 250. According to some example embodiments, at least one of the operations of the wireless communication method, or at least some of the operations of the controller 160 (or the power controller 164) of FIG. 1 may be performed by a hardware block designed by logic synthesis, and the hardware block may be included in the ASIC 210. According to some example embodiments, at least one of the operations of the wireless communication method, or at least some of the operations of the controller 160 (or the power controller 164) of FIG. 1 may be realized as the instructions stored in the main memory 290, and the main processor 270 may perform at least one of operations of the wireless communication method or at least some of the operations of the controller 160 (or the power controller 164) of FIG. 1 by executing the instructions stored in the main memory 290.

While some example embodiments have been particularly shown and described with reference, it will be understood by those of ordinary skill in the art that various changes in form and details may be made therein without departing from the spirit and scope as defined by the following claims.

What is claimed is:

1. A wireless communication method using a plurality of antennas performed by a controller, the wireless communication method comprising:
   obtaining a target transmission power level and beam forming information;
   determining at least one inactive antenna from among the plurality of antennas, based on the target transmission power level and the beam forming information; and
   controlling transmission signals provided to the plurality of antennas such that transmission via the at least one inactive antenna does not occur.

2. The wireless communication method of claim 1, wherein the obtaining comprises receiving information about the target transmission power level via at least one of the plurality of antennas.

3. The wireless communication method of claim 1, wherein the obtaining comprises calculating the target transmission power level based on a signal received via at least one of the plurality of antennas.

4. The wireless communication method of claim 1, wherein the beam forming information comprises respective phases of a plurality of transmission signals to be output via corresponding antennas of the plurality of antennas for transmitting a beam in a first direction.

5. The wireless communication method of claim 4, further comprising:
   controlling each of a plurality of active antennas from among the plurality of antennas to output a respective transmission signal having a first transmission power,
   wherein the determining the at least one inactive antenna includes determining a number of inactive antennas based on the target transmission power level and the first transmission power.

6. The wireless communication method of claim 5, wherein the determining the at least one inactive antenna further comprises:
   calculating a beam error from a first beam gain and a second beam gain, the first beam gain being based on the beam forming information, and the second beam gain being based on the number of inactive antennas; and
   determining the at least one inactive antenna based on the beam error.

7. The wireless communication method of claim 6, wherein the calculating the beam error comprises integrating a difference between the first beam gain and the second beam gain in a beam space.

8. The wireless communication method of claim 7, wherein
   the beam space is configured with quantized directions, and
   the beam error is a sum of differences between the first beam gain and the second beam gain, the differences respectively corresponding to the quantized directions.

9. The wireless communication method of claim 7, wherein the beam space is defined as a range that is between a second direction and a third direction and includes the first direction.

10. The wireless communication method of claim 5, wherein the determining the at least one inactive antenna further comprises:
    referring to one or more patterns of inactive antennas defined according to the number of inactive antennas; and
    determining the at least one inactive antenna based on the one or more patterns of inactive antennas.

11. The wireless communication method of claim 10, wherein each of the one or more patterns of inactive antennas defines at least one outermost antenna from among the plurality of antennas as being inactive.

12. The wireless communication method of claim 11, wherein the one or more patterns of inactive antennas include a pattern defining at least one antenna arranged as a second outermost antenna with respect to the at least one outermost antenna as being inactive.

13. The wireless communication method of claim 4, wherein the beam forming information further comprises respective transmission powers of the plurality of transmission signals to be used for transmitting the beam in the first direction.

14. The wireless communication method of claim 13, wherein
    the determining the at least one inactive antenna comprises sequentially determining the at least one inactive antenna according to a defined rule and the respective transmission powers of the plurality of transmission signals, and
    the defined rule specifies that at least one outermost antenna from among a plurality of active antennas of the plurality of antennas is inactivated.

15. The wireless communication method of claim 14, wherein the determining the at least one inactive antenna comprises:
    determining the at least one inactive antenna to include a particular outermost antenna from among a plurality of outermost antennas of the plurality of active antennas such that a remaining transmission power when the particular outermost antenna is inactive is closest to the target transmission power level; and
    determining whether to terminate the determining the at least one inactive antenna based on the remaining transmission power and the target transmission power level.

16. The wireless communication method of claim 1, further comprising:
    obtaining blockage information of the plurality of antennas,
    wherein the determining the at least one inactive antenna includes determining the at least one inactive antenna further based on the blockage information.

17. An apparatus for controlling a plurality of antennas, the apparatus comprising:
    a phase controller configured to generate a phase control signal for controlling respective phases of a plurality of transmission signals output via the plurality of antennas to transmit a beam in a first direction; and
    a power controller configured to
       generate a power control signal for controlling respective transmission powers of the plurality of transmission signals, and
       selectively inactivate one or more antennas of the plurality of antennas based on a target transmission power level and the respective phases.

18. The apparatus of claim 17, wherein the power controller is configured to:
    control each of the respective transmission powers to be equal to a first transmission power, and
    determine a number of the one or more antennas to be selectively inactivated based on the target transmission power level and the first transmission power.

19. The apparatus of claim 17, wherein the power controller is configured to generate the power control signal based on the first direction.

20. A wireless communication equipment comprising:
an antenna array including a plurality of antennas;
a plurality of phase shifters configured to adjust respective phases of a plurality of transmission signals output via the plurality of antennas;
a plurality of power amplifiers configured to adjust respective transmission powers of the plurality of transmission signals; and
a controller configured to
control the plurality of phase shifters, and
control the plurality of power amplifiers such that one or more antennas among the plurality of antennas is selectively inactivated based on a target transmission power level and beam forming information.

* * * * *